United States Patent
Kazmi et al.

(10) Patent No.: US 8,842,564 B2
(45) Date of Patent: Sep. 23, 2014

(54) METHOD AND DEVICES FOR A COMMUNICATION SYSTEM

(75) Inventors: Muhammad Kazmi, Bromma (SE); Simone Provvedi, Twickenham (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 31 days.

(21) Appl. No.: 13/375,512

(22) PCT Filed: Nov. 7, 2011

(86) PCT No.: PCT/SE2011/051324
§ 371 (c)(1),
(2), (4) Date: Dec. 1, 2011

(87) PCT Pub. No.: WO2012/064262
PCT Pub. Date: May 18, 2012

(65) Prior Publication Data
US 2012/0263054 A1    Oct. 18, 2012

Related U.S. Application Data

(60) Provisional application No. 61/411,550, filed on Nov. 9, 2010.

(51) Int. Cl.
*H04J 3/12* (2006.01)
*H04Q 11/04* (2006.01)

(52) U.S. Cl.
USPC .......................................... 370/252; 370/528

(58) Field of Classification Search
CPC ........... H04L 47/10; H04L 43/50; H04J 3/12; H04Q 11/04
USPC ................................................ 370/252, 528
See application file for complete search history.

(56) References Cited

U.S. PATENT DOCUMENTS

2010/0062765 A1    3/2010  Jung et al.
2012/0113866 A1*   5/2012  Tenny et al. ................. 370/254

FOREIGN PATENT DOCUMENTS

EP          2242300 A1    10/2010
WO    WO 2011/142710    * 11/2011    ............ H04W 24/10

OTHER PUBLICATIONS

NTT Docomo, Inc., "Measurement gap control in CA", 3GPP TSG-RAN WG2 #69bis, Beijing, China, Apr. 12-16, 2010, pp. 1-3, R2-102499.
Huawei, "Considerations on mobility measurements for carrier aggregation", TSG-RAN Working Group 4 Ad Hoc #2010-01; Sophia Antipolis, France, Jan. 18-22, 2010, R4-100148.

* cited by examiner

*Primary Examiner* — Ronald Abelson
(74) *Attorney, Agent, or Firm* — Coats & Bennett, P.L.L.C.

(57) ABSTRACT

The present invention relates to a method and devices for allowing a communication terminal to configure a measurement gap pattern on a downlink carrier frequency for measurement on a target carrier frequency by said communication terminal, the communication terminal being capable of performing measurements on at least two downlink carrier frequencies without measurement gap, the method comprising: obtaining an indication that there is a need for the measurement gap pattern, for performing the measurement on the target carrier frequency; retrieving information about how to configure the measurement gap pattern; and determining, based on the retrieved information, the downlink carrier frequency on which the measurement gap pattern is to be configured.

22 Claims, 5 Drawing Sheets

METHOD AND DEVICES FOR A COMMUNICATION SYSTEM

TECHNICAL FIELD

The invention relates to a method and devices for allowing a communication terminal to configure a measurement gap pattern on a downlink carrier frequency for measurement on a target downlink carrier frequency.

BACKGROUND

The WCDMA/HSPA and LTE technologies have further evolved and are constantly evolving towards multi-carrier systems. A multi-carrier UE, which has multiple receivers or a wide band receiver, is typically able to measure on inter-frequency carriers without gaps. However such UEs may still require measurement gaps for performing measurements on inter-RAT carriers and also on the additional inter-frequency carriers. The additional inter-frequency carriers are those which cannot be measured without gaps. For example in DC-HSUPA, the UE can measure on secondary DL carrier (i.e. inter-frequency), which is adjacent to the primary DL carrier without gaps. But the same UE requires gaps to measure on inter-frequency which is non adjacent to the DL primary carrier or belong to another band (e.g. band B) if the UE supports band B.

A plurality of carriers of the same radio access technology (RAT) may be aggregated, so called Intra-RAT carrier aggregation, as here discussed. To enhance peak-rates within a technology, multi-carrier or carrier aggregation solutions are known. For example, it is possible to use multiple 5 MHz carriers in HSPA to enhance the peak-rate within the HSPA network, and work is on-going for LTE Release 10 to facilitate aggregation of multiple LTE carriers. Each carrier in multi-carrier or carrier aggregation system is generally termed as a component carrier (CC) or sometimes is also referred to as a cell. In simple words the component carrier (CC) means an individual carrier in a multi-carrier system. The term carrier aggregation (CA) is also called (e.g. interchangeably called) "multi-carrier system", "multi-cell operation", "multi-carrier operation", "multi-carrier" transmission and/or reception. This means the CA is used for transmission of signalling and data in the uplink and downlink directions. One of the CCs is the primary carrier or anchor carrier and the remaining ones are called secondary or supplementary carriers. Generally the primary or anchor CC carries the essential UE specific signalling. The primary CC exists in both uplink and downlink direction CA. The network may assign different primary carriers to different UEs operating in the same sector or cell.

The CCs belonging to the CA may belong to the same frequency band (a.k.a. intra-band CA) or to different frequency band (inter-band CA) or any combination thereof (e.g. 2 CCs in band A and 1 CC in band B). The inter-band CA comprising of carriers distributed over two bands is also called as dual-band-dual-carrier-HSDPA (DB-DC-HSDPA) in HSPA. Furthermore the CCs in intra-band CA may be adjacent or non-adjacent in frequency domain (a.k.a. intra-band non-adjacent CA). A hybrid CA comprising of intra-band adjacent, intra-band non-adjacent and inter-band is also possible.

In HSPA release 10, up to 4 DL carriers can be aggregated, a.k.a. 4C-HSDPA where the DL carriers or DL cells may belong to the same frequency band or be split over two different frequency bands, e.g. 3 adjacent DL carriers in band I (2.1 GHz) and 1 DL carrier in band VIII (900 MHz). In HSPA Release 11, up to 8 DL carriers may be aggregated and may be called 8C-HSDPA. The DL carriers may be distributed over 2 or more bands. In the present version of the HSPA and LTE specifications (i.e. release 10), all the carriers that belong to one frequency band have to be adjacent when configured by higher layers (e.g. RRC). However, operation on non-adjacent carriers within the same band can result from the carrier activation/deactivation, which is performed by the lower layers (e.g. MAC). In future releases (e.g. release 11) the non-adjacent carriers within the same band may be configurable.

In LTE, intra-band CA, in principle up to 5 DL carriers each of 20 MHz, may be aggregated by the UE. At least, the UE requirements exist for 2 DL carriers, i.e. up to 40 MHz. In LTE inter-band CA, 2 DL carriers belonging to two different bands can be aggregated by the UE.

It is also contemplated to use carrier aggregation of carriers of different RATs, i.e. a multi-RAT multi-carrier concept. Using carrier aggregation between carriers of different technologies is also referred to as "multi-RAT carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers. For the sake of clarity the carrier aggregation within the same technology as described above may be regarded as 'intra-RAT' or simply 'single RAT' carrier aggregation.

It may be a problem with using gaps in measurements on a first carrier for measuring on a second carrier in that information from the first carrier may be lost or the performance of the measurement may be reduced. It would thus be advantageous to be able to improve the use of the measurement resources.

SUMMARY

The inventors have realised that problems with measurement gaps in the prior art may be prevented or at least alleviated by means of the present invention.

According to an aspect of the present invention, there is provided a method for allowing a communication terminal to configure a measurement gap pattern on a downlink carrier frequency for measurement on a target carrier frequency by said communication terminal. The communication terminal is capable of performing measurements on at least two downlink carrier frequencies without measurement gap. The method comprises obtaining an indication that there is a need for the measurement gap pattern, for performing the measurement on the target carrier frequency. The method also comprises retrieving information about how to configure the measurement gap pattern, and determining, based on the retrieved information, the downlink carrier frequency on which the measurement gap pattern is to be configured.

According to another aspect of the present invention, there is provided a gap pattern module for a communication system. The communication system comprises a communication terminal and a network. The communication terminal is capable of performing measurements on at least two downlink carrier frequencies simultaneously without measurement gap. The gap pattern module comprises circuitry for obtaining an indication that there is a need for a measurement gap pattern configured by the communication terminal on a downlink carrier frequency for measurement on a target carrier frequency by said communication terminal. The gap pattern module also comprises circuitry for retrieving information about how to configure the measurement gap pattern, and a processing unit configured for determining, based on the retrieved information, on which downlink carrier frequency the measurement gap pattern is to be configured.

According to another aspect of the present invention, there is provided a gap pattern module for a communication system. The communication system comprises a communication terminal and a network. The communication terminal is capable of performing measurements on at least two downlink carrier frequencies without measurement gap. The gap pattern module comprises means for obtaining an indication that there is a need for a measurement gap pattern configured by the communication terminal on a downlink carrier frequency for measurement on a target carrier frequency by said communication terminal. The gap pattern module also comprises means for retrieving information about how to configure the measurement gap pattern, and means for determining, based on the retrieved information, on which downlink carrier frequency the measurement gap pattern is to be configured.

According to another aspect of the present invention, there is provided a communication terminal comprising the gap pattern module of any of the above aspects. The communication terminal further comprises circuitry for configuring the measurement gap pattern on the determined downlink carrier frequency.

According to another aspect of the present invention, there is provided a network node comprising the gap pattern module of any of the above aspects. The network node further comprises a transmitter configured for signalling to the communication terminal which downlink carrier frequency has been determined.

According to another aspect of the present invention, there is provided a communication system comprising a communication terminal, a network, and the gap pattern module of any of the above aspects of the present invention.

According to another aspect of the present invention, there is provided a computer program product comprising computer-executable components for causing a gap pattern module to perform the method of the above method aspect of the present invention when the computer-executable components are run on a processing unit included in the gap pattern module.

Any of the different device aspects (gap pattern module, network node, communication terminal, communication system and computer program product) of the present invention may be used for performing the method aspect of the present invention.

The discussions above and below in respect of any of the aspects of the invention is also in applicable parts relevant to any other aspect of the present invention.

It is an advantage of the present invention that a carrier frequency on which to configure a gap pattern may be determined/chosen. Thus, the most convenient carrier frequency, or the carrier frequency where the gap pattern is least harmful, may be determined/chosen, instead of e.g. always configuring the gap pattern on the primary carrier frequency. It may also be possible to distribute a gap pattern over a plurality of carrier frequencies if desirable.

The communication terminal may be a multi-carrier communication terminal or is multi-carrier capable.

The downlink carrier frequency may be a serving downlink carrier frequency.

The method aspect of the present invention may be performed in a network node of a network to which the communication terminal is associated. The method may then further comprise signalling to the communication terminal which downlink carrier frequency has been determined. The network node may be one of a Radio Network Controller (RNC), a Node B, an eNode B, a base station, a relay node, and a donor node. The network node may inform a second network node, of the same network, of which downlink carrier frequency was determined. The second network node may be one of a Radio Network Controller, RNC, a Node B, an eNode B, a positioning node, a base station, a core network node, a relay node, and a donor node. Similarly, any of the device aspects of the present invention may be configured for any such method.

The method aspect of the present invention may be performed in the communication terminal. The method may then further comprise configuring the measurement gap pattern on the determined downlink carrier frequency. The method may then also comprise sending a signal to a network node of the network to which the communication terminal is associated, which signal comprises an indication to the network of which downlink carrier frequency was determined. Additionally or alternatively, the retrieving information may comprise receiving a signal from the network node of the network to which the communication terminal is associated, which signal comprises at least a part of the retrieved information. Similarly, any of the device aspects of the present invention may be configured for any such method.

The target carrier frequency may be an inter-RAT carrier frequency or an inter-frequency carrier frequency in relation to the downlink carrier frequency.

The retrieved information may be used to establish at least one criterion for choosing which downlink carrier frequency to determine. The at least one criterion may be one of the following criteria:

choose a downlink carrier frequency which is adjacent to the least number of other downlink carrier frequencies of the communication terminal (14);

choose a downlink carrier frequency which shares frequency band with the least number of other downlink carrier frequencies of the communication terminal (14);

choose a downlink carrier frequency where the amount of data interrupted/lost due to the gap pattern is assumed to be the least;

choose a downlink carrier frequency over which data is the least time critical;

choose a downlink carrier where there is no other gap pattern already configured;

choose a downlink carrier based on whether a gap density of the gap pattern is above or below a pre-defined threshold;

choose a primary downlink carrier; and choose a secondary downlink carrier.

The communication terminal may be in accordance with a Wideband Code Division Multiple Access (WCDMA) standard in which the measurement gap pattern is a Compressed Mode (CM) gap pattern. Additionally, a WCDMA network to which the communication terminal is associated may have activated a CM which allows the determining of the serving downlink carrier frequency, in response to receiving an Information Element from the communication terminal indicating to the network that the communication terminal supports said determining.

The method aspect of the present invention may further comprise the communication terminal signalling information to a network to which the communication terminal is associated about on which downlink carrier frequency it has configured the gap pattern. Similarly, any of the device aspects of the present invention may be configured for such a method.

The communication terminal may further comprise a transmitter configured to send a signal to a network node of the network, which signal comprises an indication of which downlink carrier frequency was determined.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

ABBREVIATIONS 4C 4 Carriers
BS Base Station
CA Carrier Aggregation
CM Compressed Mode
CPICH Common Pilot Channel
HSPA High-Speed Packet Access
DC-HSUPA Dual cell high speed uplink packet access
DB-DC-HSDPA Dual band dual cell HSDPA
GSM Global System for Mobile Communications
L2 Layer 2
LTE Long Term Evolution
MAC Medium Access Control
RAT Radio Access Technology
RNC Radio Network Controller
RSCP Received Signal Code Power
RSRQ Reference signal received quality
RSTD Reference signal time difference
UE User Equipment
UL Uplink
DL Downlink
WCDMA Wideband Code Division Multiple Access
LPP LTE positioning protocol
LPPa LTE positioning protocol annex
E-SMLC Evolved SMLC
RRC Radio Resource Control
SMLC Serving Mobile Location Center
MME Mobility management entity
SON Self Organizing Network
OSS Operational Support Systems
BCH Broadcast channel
RSSI Received signal strength indicator
PCI Physical cell identifier
CGI Cell global identifier
BSIC BS
ECGI Evolved CGI
HARQ Hybrid Automatic Repeat Request
HRPD High Rate Packet Data The communication network described herein may be a mobile communication network which can comply with any 3GPP standard or any other applicable standard, such as LTE, W-CDMA, GSM, etc. Hereinafter, references are on occasion made to a specific standard but it is to be noted that this is exemplary and does not restrict the embodiments of the invention, which can be applied to any suitable standard. The communication system and/or communication terminal may e.g. be in accordance with a WCDMA standard in which the measurement gap pattern is configured to be a Compressed Mode (CM) gap pattern. The communication system and/or communication terminal may e.g. be in accordance with an LTE standard in which the measurement gap pattern is configured to be one of the pre-defined measurement gap patterns of the standard. Presently, two measurement gap patterns are defined for LTE: one with 40 ms periodicity (inter-gap length) and another one with 80 ms periodicity. In both patterns the gap which occurs periodically is of 6 ms.

The communication terminal may be any suitable communication terminal, depending on the communication standard used, such as a user equipment (UE) according to any 3GPP standard. The communication terminal may e.g. be a mobile telephone or a portable computer. Herein, the communication terminal is often exemplified with a UE. However, the terms communication terminal and UE are herein often used interchangeably and should not limit the invention to a type of communication terminal or to a communication standard. The communication terminal is capable of performing measurements on at least two downlink carrier frequencies without measurement gap, e.g. by the communication terminal having a broadband receiver or multiple receivers. Thus, the communication terminal may be capable of performing measurements on at least two downlink carrier frequencies simultaneously without gap The term 'simultaneously' here means that the measurements can be performed on at least two downlink carriers without measurement gaps i.e. without causing interruption of data on the serving downlink carrier. In this case however the communication terminal may obtain measurement samples of cells operating on the serving carrier and target downlink carrier at the same time instances or even at different time instances. On the other hand when measurement gaps are used, the measurements on the serving downlink carrier and on the target inter-frequency/inter-RAT carrier(s), the measurement samples for the serving and inter-frequency/inter-RAT carrier(s) are obtained during different measurement instances.

Some embodiments of the present invention relate to measurement gap configurations for a communication terminal or UE which is multi-carrier/carrier aggregation (CA) capable.

Some other embodiment are additionally or alternatively relevant for a communication terminal or UE which may not be multi-carrier/CA capable but may still have means (i.e. additional radio receiver) for performing measurements on one or more inter-frequency carriers and/or inter-RAT carriers without measurement gaps or compressed mode patterns.

The terms "carrier", "frequency", "carrier frequencies" and the like are herein often used interchangeably to denote a carrier frequency or carrier wave for communication between the communication terminal and the network. The downlink carrier frequency on which the measurement gap pattern is to be configured may be a serving downlink carrier frequency serving the communication terminal or UE for downlink signalling. Below, the downlink carrier frequency is often exemplified with a serving downlink carrier frequency, but this should not limit the invention to serving downlink carreier frequencies. The target carrier frequency may be a target downlink carrier frequency.

The target carrier frequency may be an inter-RAT carrier frequency or an inter-frequency carrier frequency in relation to the downlink carrier frequency. The inter-frequency and inter-RAT carrier frequency may belong to the same frequency band which is the same as that of the downlink carrier frequency or different than that of the downlink carrier frequency. In one example the downlink carrier frequency and inter-frequency carrier frequency can belong to frequency band 1 (2 GHz range) and band 8 (900 MHz range), respectively. In another example, both the downlink carrier frequency and the inter-frequency carrier frequency can belong to frequency band 1 (2 GHz range) and may even be adjacent. In yet another example both the downlink carrier frequency and inter-frequency carrier frequency can belong to frequency band 1 (2 GHz range) but may be non-adjacent, e.g. 10 MHz apart.

That a gap pattern is configured on a downlink carrier frequency, e.g. a serving carrier frequency, implies that there are scheduled gaps by a receiver of the communication terminal/UE on the carrier frequency, during which gaps the receiver instead performs measurements on a target carrier frequency. Sometimes the term "activate" is used instead of "configure" when discussing configuring a gap pattern on a carrier frequency. These two terms are interchangeable, but herein the term "configure" is mostly used. Furthermore the communication terminal/UE may configure a gap pattern based on received gap configuration information or any indication or request received from a network node. Therefore it should be noted that configuring or activating a gap pattern by the communication terminal/UE may imply that the communication terminal/UE uses a gap pattern received from the network for performing one or more measurements on one or more cells operating on a downlink carrier.

The network comprises at least one, usually a plurality of, network node(s), at least partly for communication with the communication terminal. The network node may be any suitable network node, depending on the embodiment of the invention and the communication standard used. However, whichever network node is mentioned herein, it is only to be regarded as an example and should not limit the invention to a type of network node or to a communication standard. Examples of network nodes include RNC, Node B, eNode B, positioning node, base station, core network node, relay node, and donor node, depending on the communication standard used for the network. Typically, the communication terminal is associated with the network by being connected to a network node of the network, such as to a Node B or eNode B or other base station, allowing communication between the communication terminal and the network.

Figure 1:
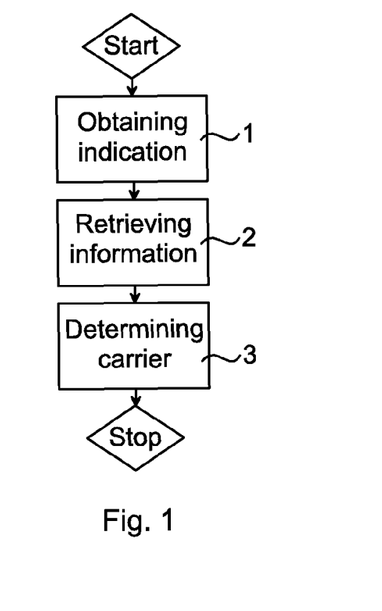
FIG. 1 is a schematic flow chart of an embodiment of a method according to the present invention.

With reference to FIG. 1, an embodiment of a method of the present invention is illustrated. An indication that there is a need for a gap pattern to be configured on a carrier frequency is obtained in step 1 of the method. The need may e.g. be due to a hand-over of the communication terminal to be performed, or any other reason for performing measurements on a target carrier frequency. The indication may be obtained 1 by e.g. the communication terminal itself, or by a node of a communication network to which the communication terminal is connected or otherwise associated. Information about how to configure the measurement gap pattern is retrieved in step 2. This may be done in response to the obtaining 1 of an indication. The information retrieved 2 may e.g. comprise a criterion or pre-defined rule on how to choose which carrier frequency to use for the gap pattern. The criterion or rule may e.g. be pre-programmed in the device performing the inventive method, or it may be signalled to the device from e.g. a network node. Based on the retrieved 2 information, the serving downlink carrier frequency on which the gap pattern is to be configured is determined in step 3 of the inventive method. The determination 3 implies that it is decided on which carrier frequency or frequencies the gap pattern should be configured based on the retrieved 2 information. Whether or not the gap pattern is actually configured in accordance with the determination 3 is not part of the inventive method of FIG. 1.

Figure 2:
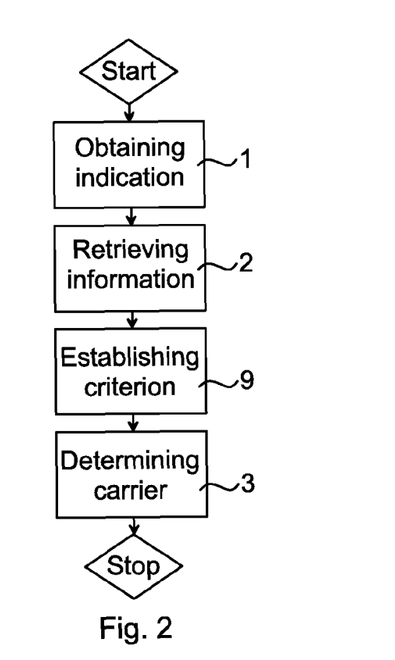
FIG. 2 is a schematic flow chart of another embodiment of a method according to the present invention.

FIG. 2 illustrates another embodiment of a method of the present invention. The steps 1-3 discussed in relation to FIG. 1 are the same, but in an additional step 9 the information retrieved in step 2 is used to establish at least one criterion for choosing which of the downlink carrier frequencies to determine in step 4. For instance, the information retrieved in step 2 may comprise such a criterion. If several criteria are determined, they may be on different hierarchical levels, such that e.g. a primary criterion is used to choose a sub-group of the downlink carrier frequencies and a secondary criterion is used to choose between the carrier frequencies of this sub-group. The carrier frequency on which to configure the gap pattern may then, in step 4, be determined based on or in accordance with the at least one criterion established in step 9. Examples of criteria which may be established in step 9 may be:

choose a serving downlink carrier frequency which is adjacent to the least number of other serving downlink carrier frequencies of the communication terminal;

choose a serving downlink carrier frequency which shares frequency band with the least number of other serving downlink carrier frequencies of the communication terminal;

choose a serving downlink carrier frequency where the amount of data interrupted/lost due to the gap pattern is assumed to be the least;

choose a serving downlink carrier frequency over which data is the least time critical;

choose a serving downlink carrier where there is no other gap pattern already configured;

choose a serving downlink carrier based on whether a gap density of the gap pattern is above or below a pre-defined threshold;

choose a primary serving downlink carrier; and choose a secondary serving downlink carrier.

Figure 3:
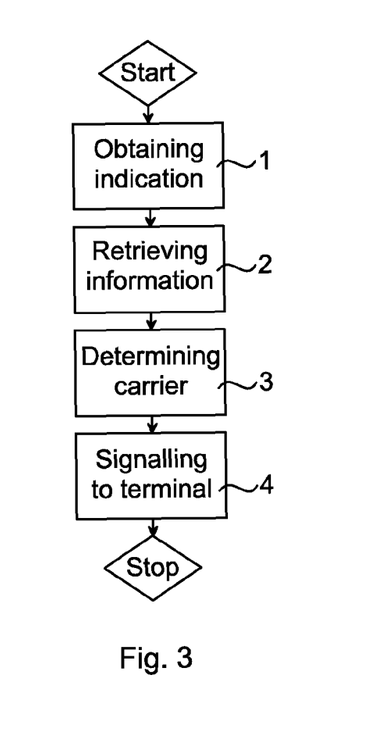
FIG. 3 is a schematic flow chart of another embodiment of a method according to the present invention.

FIG. 3 illustrates another embodiment of a method of the present invention, wherein the method is performed by the network, such as in a network node. The steps 1-3 discussed in relation to FIG. 1 or the steps 1-3 and 9 discussed in relation to FIG. 2 are the same in accordance with FIG. 3. According to the embodiment of FIG. 3, which serving downlink carrier frequency has been determined 3 may be signalled 4 to the communication terminal. In this way, the network may inform the communication terminal about how the communication terminal should configure the gap pattern, e.g. on which carrier frequency/frequencies. The signalling 4 may be e.g. in the form of an information element (IE) in a communication message sent to the communication terminal from a node of the network.

Figure 4:
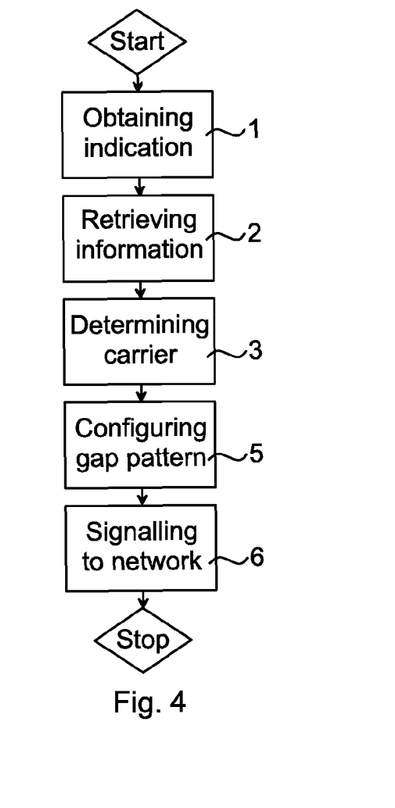
FIG. 4 is a schematic flow chart of another embodiment of a method according to the present invention.

FIG. 4 illustrates another embodiment of a method of the present invention, wherein the method is performed by the communication terminal. The steps 1-3 discussed in relation to FIG. 1 or the steps 1-3 and 9 discussed in relation to FIG. 2 are the same in accordance with FIG. 4. According to the embodiment of FIG. 4, the measurement gap pattern may be configured 5 on the determined 3 serving downlink carrier frequency. The communication terminal thus implements the determining 3 of the carrier frequency by configuring 5 the gap pattern on this determined 3 carrier frequency. The communication terminal may additionally send 6 a signal to the network, e.g. to a network node to which the communication terminal is associated. This signal which is sent 6 may contain an indication to the network of on which carrier frequency the gap pattern has been configured 5. The signal may e.g. be sent 6 as an IE in a communication message from the communication terminal to the network/network node.

Figure 5:
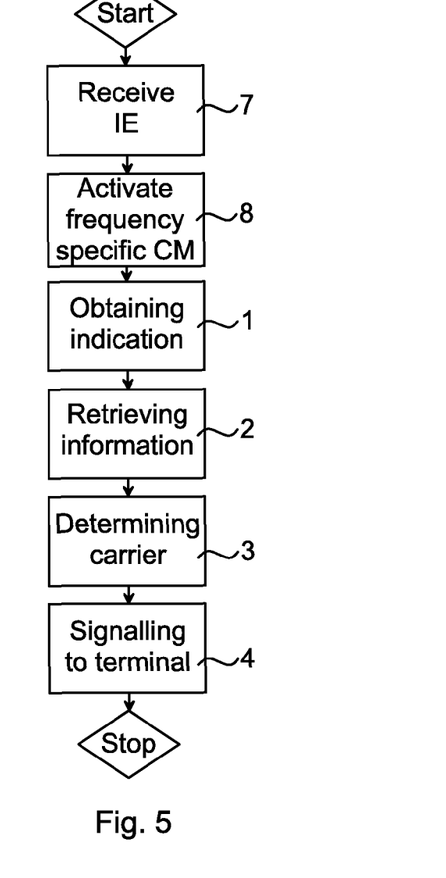
FIG. 5 is a schematic flow chart of another embodiment of a method according to the present invention.

FIG. 5 illustrates another embodiment of a method of the present invention, wherein the method is performed by the network/network node and the communication system, comprising the network and the communication terminal, is in accordance with a WCDMA standard for communication. According to the WCDMA standard, gap patterns are configured in compressed mode (CM). In step 7 of the method, the network node receives 7 a message or an IE of a message from the communication terminal, which message or IE informs the network that the communication terminal is capable of performing measurements on at least two downlink carrier frequencies simultaneously without gap. This IE may e.g. be sent as a part of the UE measurement capabilities in accordance with the communication standard. In response to receiving 7 this IE, the network/network node may then activate 8 a compressed mode which allows the determining 3 of the serving downlink carrier frequency. This mode may e.g. be called a frequency specific compressed mode. The network/network node may then proceed e.g. with steps 1-3 of FIG. 1 or steps 1-4 of FIG. 3. In conformity with the method of FIG. 5, a new IE "Frequency Specific CM" may also be introduced in the DPCH Compressed Mode Info and/or in the DPCH Compressed Mode Status Info of the WCDMA communication standard.

Figure 6:
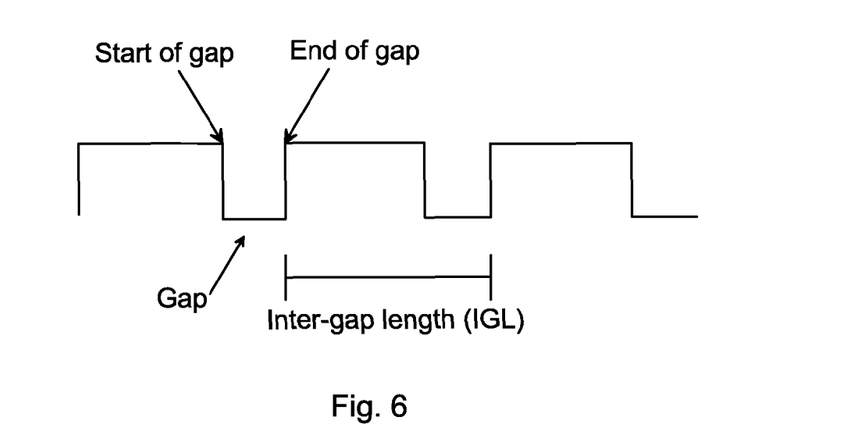
FIG. 6 is a schematic illustration of a gap pattern configured on a carrier frequency.

FIG. 6 illustrates an embodiment of a gap pattern which is configured on a carrier frequency. That a gap pattern is configured on a carrier frequency, e.g. a serving carrier frequency, implies that gaps are scheduled gaps by a receiver of the communication terminal/UE on the carrier frequency, during which gaps the receiver instead performs measurements on a target carrier frequency. Each gap in the gap pattern has a scheduled start of gap and end of gap which define the gap length. The distance in time between one gap and its consecutive gap, e.g. as measured between the end time of the gap and the end time of the consecutive gap as shown in FIG. 6, is called the inter-gap length (IGL). The inter-gap length may alternatively be called a gap periodicity or a gap pattern periodicity.

Figure 10:
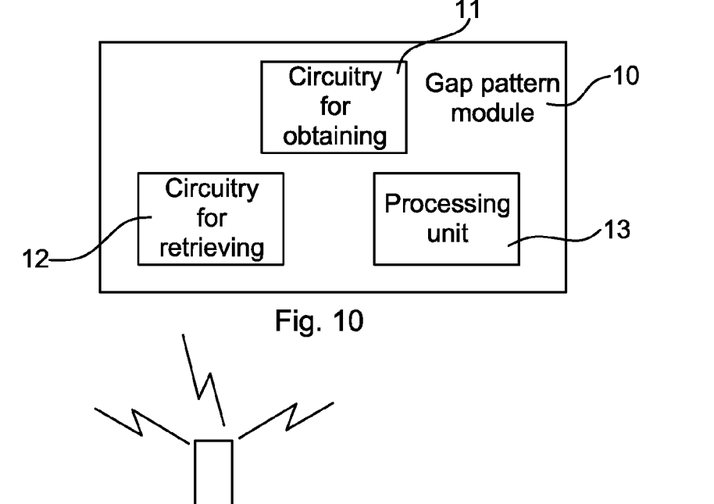
FIG. 10 is a schematic block diagram illustrating an embodiment of a gap pattern module of the present invention.

With reference to FIG. 10, an embodiment of a gap pattern module 10 of the present invention will now be discussed. The gap pattern module is configured for being included in a communication system, which system comprises a network with network nodes, and at least one communication terminal. As discussed herein, the gap pattern module may be included in any part of the communication system, such as in the communication terminal or in a network node. The gap pattern module may be configured for performing the inventive method of the present disclosure, e.g. as illustrated by any of the FIGS. 1-5. The gap pattern module 10 may comprise circuitry 11 for the obtaining 1 of an indication that there is a need for a measurement gap pattern configured by the communication terminal on a serving downlink carrier frequency for measurement on a target downlink carrier frequency by said communication terminal. This circuitry 11 for obtaining may e.g. be circuitry associated with a part of a communication terminal or network node comprising the module 10 which is involved in deciding whether a hand-over of the communication terminal may be convenient. The gap pattern module 10 may comprise circuitry 12 for retrieving 2 information about how to configure the measurement gap pattern. This circuitry 12 for retrieving may e.g. be configured for retrieving pre-programmed rules or criteria for how to choose or determine 3 the carrier frequency, or pre-determined rules or criteria of the communication standard used, or be associated with a radio receiver for receiving rules or criteria from another part of the communication system. The gap pattern module 10 may comprise a processing unit 13 configured for determining 3, based on the retrieved 2 information, on which serving downlink carrier frequency the measurement gap pattern is to be configured. The processing unit may communicate with the circuitry 11 for obtaining and/or the circuitry 12 for retrieving in order to process the obtained indication and/or retrieved information in order to perform the determining 3. The processing unit 13 may thus implement retrieved 2 rules or criteria in order to perform the determining 3. The gap pattern module 10 may also comprise or be associated with additional components, such as a memory or other storage means, as discussed in respect of FIG. 15. The storage means may cooperate with and be used by the processing unit 13.

Figure 8:
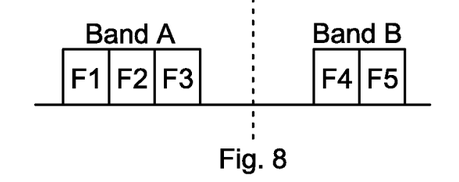
FIG. 8 is a schematic block diagram illustrating serving carrier frequencies in different frequency bands for an embodiment of a communication terminal of the present invention.
Figure 11:
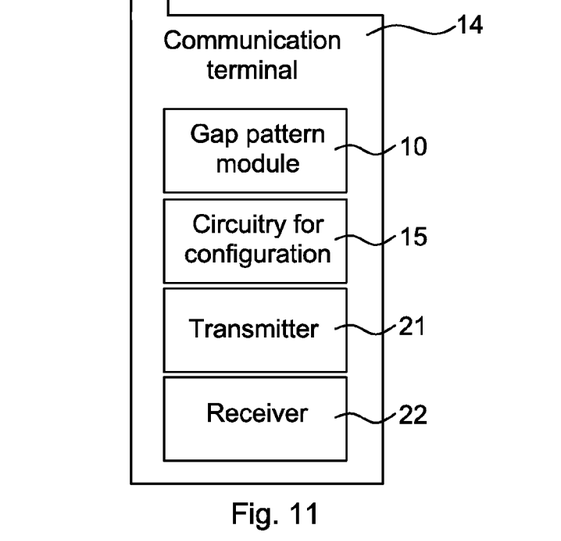
FIG. 11 is a schematic block diagram illustrating an embodiment of a communication terminal of the present invention.

FIG. 11 illustrates an embodiment of the present invention where the gap pattern module discussed in relation to FIG. 8 is comprised in a communication terminal 14. The communication terminal 14 may be a wireless communication terminal, configured to communicate with the network over a radio interface. Apart from the gap pattern module 10, the communication terminal 14 may comprise circuitry 15 configured for configuring 5 the measurement gap pattern on the determined 3 serving downlink carrier frequency. The communication terminal may further comprise a transmitter 21 and/or a receiver 22. The transmitter may e.g. be configured for sending 6 a signal to a network node of the network, which signal comprises an indication of which serving downlink carrier frequency was determined. The receiver may e.g. be configured for receiving a signal from the network node comprising at least a part of the retrieved 2 information in which the determining 3 may be based. The transmitter 21 and/or the receiver 22 may be associated with an antenna of the communication terminal for radio communication.

Figure 12:
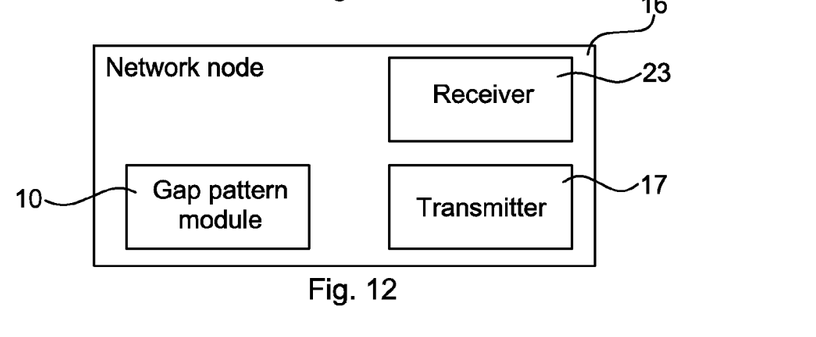
FIG. 12 is a schematic block diagram illustrating an embodiment of a network node of the present invention.

FIG. 12 illustrates an embodiment of the present invention where the gap pattern module discussed in relation to FIG. 10 is comprised in a network node 16. The network node may be configured for communication with a communication terminal, e.g. wirelessly over a radio interface, in a communication system. Apart from the gap pattern module 10, the network node 16 may comprise a transmitter 17 and/or a receiver 23. The transmitter 17 may be configured for signalling 4 to a communication terminal 14 which serving downlink carrier frequency has been determined 3 by the gap pattern module 10 in the network node 16. The receiver 23 may e.g. be configured to receive a signal sent 6 from a communication terminal 14 and informing the network on which carrier frequency the gap pattern has been determined 3 and/or configured 5. The transmitter 17 and/or the receiver 23 may be associated with an antenna of the network node for radio communication.

Figure 13:
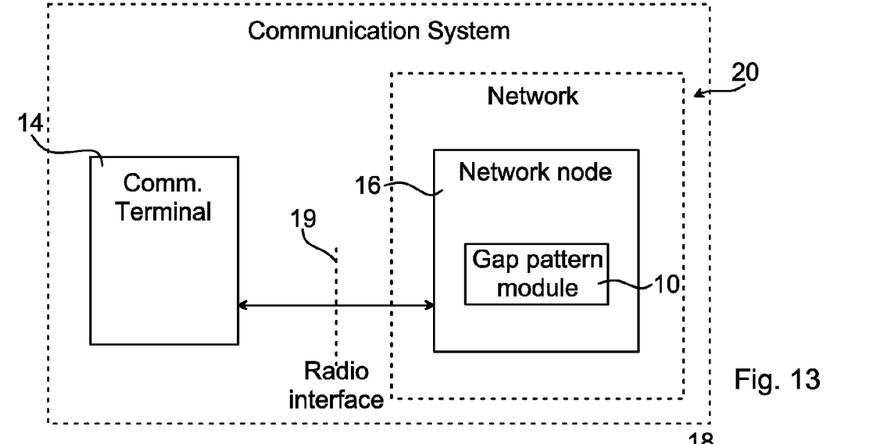
FIG. 13 is a schematic block diagram illustrating an embodiment of a communication system of the present invention.

FIG. 13 illustrates an embodiment of a communication system 18 of the present invention. The communication system 18 comprises a network 20 and a communication terminal 14. The communication terminal 14 may be as discussed herein, e.g. in relation to FIG. 11, but the communication terminal 14 might not comprise a gap pattern module 10. The network 20 comprises a network node 16. The network node 16 may be as discussed herein, e.g. in relation to FIG. 12. The network 20 may additionally comprise further, similar or different, network nodes 16. According to the embodiment of FIG. 13, the network node 16 comprises the gap pattern module 10, as discussed herein e.g. in relation to FIG. 10. The network node 16 may thus perform an inventive method according to the present disclosure. The network node 16 may communicate wirelessly with the communication terminal 14 over the radio interface 19 as indicated by the double headed arrow in FIG. 13.

Figure 14:
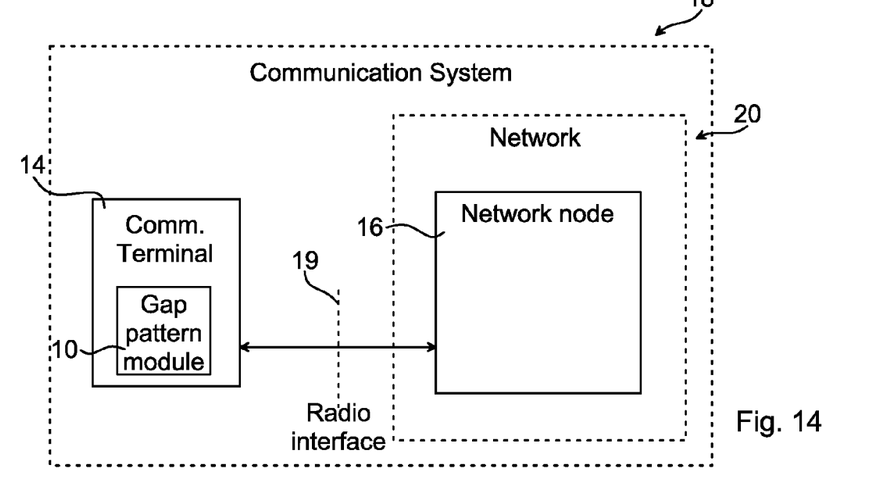
FIG. 14 is a schematic block diagram illustrating another embodiment of a communication system of the present invention.

FIG. 14 illustrates another embodiment of a communication system 18 of the present invention. The communication system 18 comprises a network 20 and a communication terminal 14. The communication terminal 14 may be as discussed herein, e.g. in relation to FIG. 11. The network 20 comprises a network node 16. The network node 16 may be as discussed herein, e.g. in relation to FIG. 12, but the network node 16 might not comprise a gap pattern module 10. The network 20 may additionally comprise further, similar or different, network nodes 16. According to the embodiment of FIG. 14, the communication terminal 14 comprises the gap pattern module 10, as discussed herein e.g. in relation to FIG. 10. The communication terminal 14 may thus perform an inventive method according to the present disclosure. The network node 16 may communicate wirelessly with the communication terminal 14 over the radio interface 19 as indicated by the double headed arrow in FIG. 14.

As an exemplary variant of the communication system 18 of FIG. 13 and/or of FIG. 14, both the communication terminal 14 and the network node 16 may comprise a gap pattern module 10.

Figure 15:
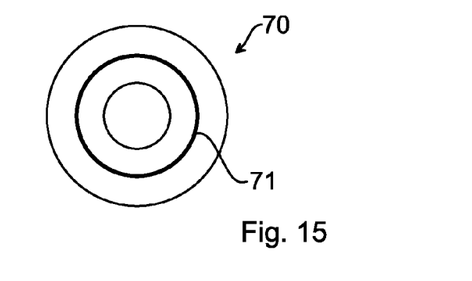
FIG. 15 is a schematic illustration of a computer program product of the present invention.

With reference to FIGS. 10 and 15, the gap pattern module 10 of embodiments of the present invention may be a equipped with one or more processing units CPU 13, e.g. in the form of microprocessor(s) executing appropriate software stored in associated memory storage for procuring required functionality. However, other suitable devices with computing capabilities could be used, e.g. an application specific integrated circuit (ASIC), a field programmable gate array (FPGA), a complex programmable logic device (CPLD), etc., for performing a method of the present invention, while executing appropriate software stored in a suitable storage area, on a computer readable medium or computer program product 70, such as a RAM, a Flash memory or a hard disk, comprising computer-executable components/software 71 for causing the gap pattern module 10 to perform the method of the present invention.

In the following, embodiments of the invention will be further discussed and additional examples will be presented.

As mentioned above, measurement gaps may be needed when measuring on a new carrier. A legacy single carrier UE (i.e. non CA capable) typically has a receiver able to receive data only on one carrier frequency e.g. one receiver for 5 MHz in case of WCDMA or 20 MHz in case of LTE (i.e. one carrier in LTE can be up to 20 MHz). This means such a UE needs measurement gaps to perform inter-frequency and inter-RAT measurements. The measurements may belong to any category. For example they may be neighbouring cell measurements like PCI identification in LTE or HSPA, ECGI or CGI identification in LTE FDD/TDD or HSPA FDD/TDD, LTE RSRP or RSRQ measurements in LTE or CPICH RSCP or CPICH Ec/No measurements in WCDMA. Yet other examples are: GSM carrier RSSI measurement, GSM BSIC identification, CDMA2000 measurements e.g. CDMA 2000 1x Pilot Strength, HRPD Pilot Strength etc.

There may also be positioning related measurements e.g. RSTD in LTE. The UE may also be able to perform other types of measurements e.g. measurements for minimization of drive tests such as pilot measurements or BCH failure rate, measurements for self organizing network (SON) etc.

During gaps the UE performs measurement on the target frequency or target RAT and therefore it cannot receive the data from the serving cell, resulting in a gap in the measurement on the serving cell.

In WCDMA, the measurement gaps are called compressed mode (CM) patterns. The CM pattern comprises periodical gaps of 7 or more slots occurring with certain periodicity. During the gaps the UE switches from the serving WCDMA carrier to the WCDMA inter-frequency carrier or inter-RAT frequency carrier (e.g. to an LTE carrier) for performing the measurement on the target inter-frequency or inter-RAT frequency.

In WCDMA a separate CM pattern is to be activated for performing measurement on each inter-frequency or inter-RAT carrier.

The CM patterns allow the UE to, to some extent, recover the data lost during the gaps, e.g. by lowering the spreading factor and increasing the BS transmitted power to the UE during the recovery frames.

In LTE, the inter-frequency and inter-RAT measurements are also performed during periodical gaps, which occur with periodicity of 40 ms (pattern #0) or 80 ms (pattern #1). Each gap, during which the UE performs inter-frequency and inter-RAT measurements, may consist of 6 ms. Unlike WCDMA, the loss in data during the gaps cannot be compensated. This is because there is no concept of compressed frames/subframes which exists in WCDMA where the spreading factor can be lowered to recover the loss of data in gaps. This means that in LTE the peak data rate will be reduced due to the measurement gaps, where data cannot be transmitted.

A CA capable communication terminal or UE may be able to perform measurements on a target carrier without gaps in measurements on a serving carrier frequency. A CA capable UE (intra-RAT or multi-RAT CA) may have a wide band receiver (i.e. in case of intra-band contiguous CA) or multiple receivers (i.e. in case of inter-band CA).

Hence such a UE may also be capable of performing measurements on non-serving carrier without measurement gaps. For example an intra-RAT-intra-band contiguous CA UE may be capable of measuring on inter-frequency without gaps.

It is mandatory for a UE supporting DC-HSUPA to measure on the DL frequency (carrier) associated with the secondary UL carrier frequency without compressed mode, as long as the secondary uplink carrier frequency is configured. A UE supporting the dual cell feature might be able to perform measurements without compressed mode on the secondary DL carrier frequency. Similarly a DB-DC-HSDPA UE may also have the capability to perform measurements without compressed mode on the DL secondary carrier, which belong to the second band jointly supported with the band of the primary DL carrier. In case of 4C-HSDPA, the UE may also have the capability to perform measurements without compressed mode on the second and third DL carriers, which may belong to any of two bands i.e. band of the primary DL carrier or band jointly supported with the band of the primary DL carrier.

In LTE, a CA capable UE is also required to perform measurements on the secondary DL carriers (a.k.a. DL secondary cell or DL Scell). The DL Scells may be adjacent to the DL primary carrier (a.k.a. Pcell) in case of intra-band contiguous CA. The DL Scells may belong to another band in case of inter-band non-contiguous CA.

A multi-RAT CA capable UE may also be able to perform inter-RAT measurements without gaps. For example, the LTE-WCDMA multi-RAT UE may be able to perform measurements without gaps/compressed mode patterns on the WCDMA carrier when the primary/serving RAT is LTE and on the WCDMA carrier when the primary/serving RAT is WCDMA.

However, a CA capable communication terminal or UE may be able to perform measurements with a gap pattern. A CA capable UE (intra- or multi-RAT) may also have the basic measurement capability of performing measurements on inter-frequency or inter-RAT carrier using measurement gaps.

Thus, the network may configure the CA capable UE to perform measurements on inter-frequency carrier using gaps even if such a UE is capable of measuring inter-frequency carrier without gaps.

The network may even request the UE to perform measurements with and without gaps on the same inter-frequency carrier, e.g. a DC-HSUPA UE may be requested to measure on DL secondary carrier during the gaps of the CM pattern and without gaps. For example, the network may configure different events for the gap based and non-gap based measurements. In this way the network may obtain large number of measurement statistics and reports, which in turn could be used for the same purpose (e.g. handovers) or for multiple purposes e.g. handover, load balancing, network planning and optimization etc.

Furthermore, the intra-RAT CA capable UE supporting inter-frequency measurements without gaps (e.g. DC-HSUPA or DB-DC-HSDPA or LTE intra-band CA or LTE inter-band CA etc) may still need measurement gaps or compressed mode to perform inter-RAT measurements. For example, a DC-HSUPA UE may require CM patterns to perform measurements such as GSM carrier RSSI on GSM carrier or RSRP/RSRQ on LTE carrier. In another example, an LTE intra-band UE may require measurement gaps to perform measurements such as GSM carrier RSSI on GSM carrier or WCDMA CPICH measurements on a target WCDMA carrier.

In single carrier systems (i.e. non-CA capable UE), the measurement gaps (i.e. measurement gaps in LTE or compressed mode patterns in WCDMA/HSPA) can be configured only on the serving carrier frequency, which is the only carrier on which the UE receives data.

In multi-carrier systems, the measurement gaps/CM patterns may be configured on the primary DL carrier/primary DL cell. This means that the measurement gaps, which are configured on the primary DL carrier, may also used by the UE for performing the measurements on all inter-frequency and/or inter-RAT measurements i.e. including the measurements on the secondary cells even if they operate on the secondary bands (e.g. band B). The primary DL carrier may operate on the primary band (e.g. band A). The primary band may however also contain secondary cells.

This means that the data interruption due to the measurements gaps will occur on the primary carrier. The data interruption may even occur on the primary and also on all secondary carriers, which are adjacent to the primary carrier. This is because the adjacent carriers typically share a radio part e.g. power amplifier. The PA carrier frequency has to be retuned during the gaps to measure on the cells on the target carrier (i.e. inter-frequency and/or inter-RAT). These aspects are further elaborated below with an example.

The primary carrier which may bear gaps may, however, contain more important data compared to that on the secondary carriers. Furthermore the primary and one or more secondary carriers may be adjacent in the same band whereas remaining secondary carriers may belong to a different band (e.g. 3 carriers including primary in band A and 1 carrier in band B in a 4C-HSDPA scenario). In such a scenario there may be more impact in terms of the overall data interruption in case the measurement gaps are configured on band A. This is because the communication terminal or UE may have a single broadband receiver for receiving all 3 carriers on band A and as a consequence, due to the gaps, the transmissions on all adjacent carriers in the same band (i.e. on band A) may be interrupted. This may be particularly undesirable in case the carriers on band A carry delay sensitive data e.g. VoIP etc.

Exemplary embodiments, with references to the figures, comprise means to determine/chose 3 the downlink carrier frequency over which the measurement gaps for performing inter-frequency/inter-RAT measurements are to be configured 5 in a multi-carrier/carrier aggregation system.

An exemplary method (cf. FIG. 3) in the network node (e.g. RNC/Node B in HSPA or eNode B in LTE) may comprise:
  Signalling means 17 to indicate the downlink carrier(s) frequency(ies) over which the communication terminal/UE 14 shall configure/activate 5 the measurement gaps for performing at least one type of measurements on an inter-frequency and/or inter-RAT carrier.

An exemplary method in the communication terminal/UE may comprise (cf. FIG. 4):
  Receiving 2 an indication from the network node 16 specifying the downlink carrier(s) frequency(ies) over which the measurement gaps for performing at least one type of measurements on an inter-frequency and/or inter-RAT carrier are to be configured; and Configuring/activating 5 the measurement gap on the specified downlink carrier frequency based on the received indication.

An exemplary method in the communication terminal/UE 14 may further comprise:

Configuring/activating 5 the measurement gap on the downlink carrier frequency based on at least one pre-defined rule or criterion 9.

Exemplary embodiments enable the network 20 to choose the downlink carrier(s) frequency(ies) on which the communication terminal/UE 14 shall activate/configure 5 the measurement gaps for performing the inter-frequency and/or inter-RAT measurements.

Exemplary embodiments may comprise one or more of the following aspects:

Means 13 in the network node 16 for determining 3 the DL carrier(s) frequency(ies) for configuring measurement gaps.

Means 17 in the network node 16 for signalling 4 the indication to the communication terminal 14 to indicate the DL carrier(s) frequency(ies) over which the measurement gaps are to be configured.

Means 22 in the communication terminal/UE 14 for receiving the indication and, based on the received indication, configuring 5 the measurement gaps over the specified DL carrier(s) frequency(ies)

Pre-determined rules or criteria 9 to determine 3 the DL carrier(s) over which the measurement gaps are to be configured.

The above-indicated embodiments will be described in more detail below.

The downlink carrier frequency on which to configure the gap pattern may be determined by the network 20, such as by a network node 16. According to this embodiment, the network node which configures the measurement gaps for enabling the communication terminal/UE 14 to perform the gap-assisted measurements (e.g. inter-frequency/Inter-RAT measurements such as neighbouring cell CPICH measurements in HSPA) determines 3 the most suitable DL carrier frequency on which the gaps should be activated.

Figure 7:
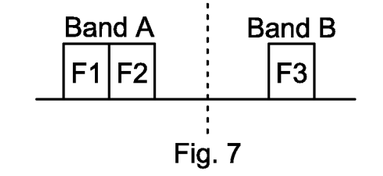
FIG. 7 is a schematic block diagram illustrating serving carrier frequencies in different frequency bands for an embodiment of a communication terminal of the present invention.

Examples of criteria (of method step 9) for choosing/determining the most appropriate carrier frequency are:

Least number of carriers in one band: The network chooses the carrier which is adjacent to the least number of DL carriers. For example, in FIG. 7, F3 on band B may be chosen for activating the gaps. The reason is that if F1 is chosen then there will be data interruption on all adjacent carriers in band A (i.e. on F1 and F2) during the occurrence of the measurement gaps.

Least data interruption/loss: The network may choose the DL carrier for activating the gaps where the data loss or interruption is likely to be the least. For example, the carrier over which the transmission is sporadic or the traffic is low may be selected by the network for activating the gaps. The network, when selecting the DL carrier, may also consider the uplink traffic in case there is also UL multi-carrier transmission. This is because the measurement gaps may lead to the interruption/loss of data on the uplink carrier which is associated with the DL carrier on which the gaps are activated, i.e. the measurement gaps occur on both DL carrier and the associated UL carrier.

Type of service/time criticality: The network may choose the DL carrier for activating the gaps over which the data is less time critical. For example if data transmission on F1 comprises of mainly real time service and on F2 comprises of mainly non real time service then the network may select F2 to activate the gaps. This is because the transmission delay may become longer due to the gaps.

Distribute measurement gaps over carriers: According to this criterion the network may configure different gaps on different carriers in case more than one measurement gap pattern is activated. For example in FIG. 7, assume HSPA multi-carrier system, the network may configure one compressed mode pattern #1 on F1 for UE to perform the LTE measurements and another compressed mode pattern #2 on F3 for UE to perform the GSM measurements. In prior art both patters are always configured on F1; this may lead to more loss of data on F1 compared to the disclosed method which allows distribution of the gap patterns across carriers.

Measurement gap density: Another criterion to determine the DL carrier may be based on the density of the measurement gaps. For example if the gaps are denser (e.g. each gap is above threshold and/or each gap occurrence in time is below another threshold) then the network may decide to configure that gap pattern on the secondary carrier in the second or subsequent bands. This is to minimize loss of data or peak throughput on the primary carrier.

This embodiment may be mainly network implementation related. However based on suitable criteria, the network 20 may request the UE 14 to configure the gaps on the appropriate carrier for performing the gap-assisted (or gap based measurements such as inter-frequency or inter-RAT).

The network 20, e.g. the network node 16 determining the carrier frequency, may send 4 a signal to the communication terminal 14 to indicate to the communication terminal which DL carrier has been determined 3 for configuring the gap pattern. Using one or more of the criteria described above, or any other suitable criterion, the network node 16 (e.g. RNC/Node B in HSPA or eNB in LTE) may signal 4 the information related to the determined DL carrier frequency over which the UE should configure/activate the measurement gap pattern. The signalled 4 information may comprise the DL carrier frequency number such as absolute channel number (e.g. UARFCN in HSPA) or any other suitable indicator which enables the UE 14 to identify the DL carrier on which it has to activate the gaps. The information may also be expressed in terms of only frequency bands over which the UE should configure the gaps e.g. for UE with inter-band CA with carriers on 2 frequency bands (band A and band B), the UE may be requested to configure gaps on band B. Then it may be up to the UE over which specific DL carrier in the specified band it should configure the gaps or the frequency may always be pre-defined, e.g. as the first frequency in the band.

The carrier frequency and the associated gaps may be linked to a particular type of inter-frequency and/or inter-RAT measurements or they may be applicable for all types of measurements. For example in HSPA, there may be one CM pattern for measuring on each inter-frequency/inter-RAT carrier. Hence, in HSPA, the CM pattern and the DL carrier on which the CM pattern should be activated may be linked to a particular type of measurement e.g. CM pattern #1 to be used for performing CPICH measurements on HSPA inter-frequency should be activated on DL carrier F1; whereas CM pattern #2 to be used for performing LTE RSRP/RSRQ measurements on inter-RAT frequency should be activated on DL carrier F2.

This flexibility in choosing the DL carrier for gap patterns may be achieved by means of higher layer signalling (e.g. RRC signalling). However other means of signalling 4, e.g. layer 2 or MAC layer, may also or alternatively be used to provide this indication to the UE 14. This flexibility or mechanism may be advantageous for the UE which is multi-carrier/CA capable.

Exemplary embodiments may also apply to UE 14 which may not be multi-carrier/CA capable (i.e. a UE which receives data only on one DL carrier) but has means 22 to perform measurements on one or more inter-frequency or inter-RAT carrier without measurement gaps. Consider a UE which can receive data on only one carrier but can also measure on another carrier without gaps, e.g. F1 is the serving carrier and F2 can be measured without gaps but no data can be received in F2 by the UE. Hence, in this example, the signalling means 17 may enable the network 20 to specify that the UE 14 configures 5 the measurement gaps for performing the inter-frequency measurements on F2. In this way there will not be any loss of data on the serving carrier F1. In prior art the measurement gaps are always configured on F1 (the primary carrier frequency) leading to loss of data.

The gap pattern may be configured 5 over the determined DL carrier frequency by the communication terminal/UE 14. This embodiment may comprise a process in the UE of:

Receiving from the network node 16 the information related to the DL carrier(s) frequency(ies) over which it should configure 5 the measurement gaps for performing at least one inter-frequency and/or inter-RAT measurement;

Interpreting the received information;

Configuring 5 the measurement gaps on the DL carrier(s) frequency(ies) for performing the at least one measurement on the inter-frequency/inter-RAT measurements as determined from the received information; and/or Reporting 6, to the network, at least one measurement on the inter-frequency/inter-RAT measurements performed during measurement gaps, which are configured over the DL carrier(s) frequency(ies) as requested by the network 20.

Alternatively or in addition, the network 20 may at least partly determine the carrier frequency, and the communication terminal 16 may itself at least partly determine the carrier frequency on which to configure 5 a gap pattern. This may e.g. be achieved by means of pre-defied rules (cf. method step 9) pre-programmed or otherwise configured in the communication terminal 14. According to some exemplary embodiments, the DL carrier frequency on which the gaps are to be activated is determined by pre-determined rules e.g. specified in the standard. This may imply that the network 20 does not have to signal this information (i.e. the DL carrier on which the gaps are to be configured/activated) to the UE 14. Yet another possibility is that in case the DL carrier information is not explicitly signalled 4, then the UE 14 may use 9 one or more pre-defined rules, otherwise the UE 14 may use the signalled 4 information for activating 5 the gaps on a DL carrier.

Furthermore, when the UE 14 decides 3 the carrier on which the gaps are to be activated the UE may also indicate 6 this information to the network node e.g. BS, RNC/Node B or eNB in LTE.

Alternatively, the network node 16 (e.g. Node B or eNB) may itself detect over which carrier the gaps are activated by the UE 14. For example, the network 20 may determine this if there is no feedback response from the UE within a time period (T1) e.g. no HARQ feedback containing ACK/NACK or CQI response within T1 and T2 respectively.

Examples of the pre-determined rules are as follows:

On primary carrier: The measurement gaps are activated on the DL primary carrier if the number of DL carriers is the same in all bands. Another possibility is that measurement gaps are activated on the DL primary carrier if all the carriers are in the same band or if all of them are adjacent.

Figure 9:
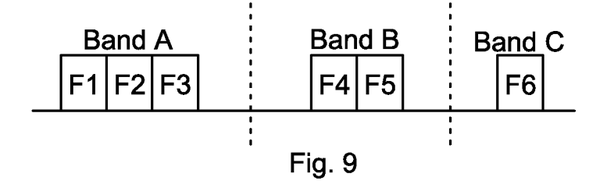
FIG. 9 is a schematic block diagram illustrating serving carrier frequencies in different frequency bands for an embodiment of a communication terminal of the present invention.

On most isolated carrier: According to this rule, the UE activates the measurement gaps on the carrier which is not adjacent to other carriers or which has least number of adjacent carriers. For example in FIGS. 8 and 9, the UE should activate the measurement gaps on band B and band C, respectively.

Separate DL carriers for activation of multiple gaps: In case more than one measurement gap pattern is used (e.g. in HSPA one CM pattern is used for GSM measurements and one for LTE measurements) then an alternating rule may be used. For example, each measurement gap pattern may be activated on a different DL carrier. For example in FIG. 8, the HSPA CA capable UE may activate an CM pattern #1 for doing inter-frequency measurements on one of the carriers on band A and CM pattern #2 for doing inter-RAT LTE measurements on one of the carriers on band B.

Measurement gap density: According to this rule the denser gap pattern (i.e. more frequency and/or with larger gaps) may be configured on a secondary carrier and preferably on a band which does not contain the primary carrier.

Any combinations of the above rules may also be used.

The determining of the carrier frequency may be based on a combination of partial determination by the network 20, signalled 4 to the communication terminal 14, and partial determination by the communication terminal 14, e.g. by means of pre-defined rules as discussed above. This could be regarded as a hybrid mechanism. According to this embodiment, the DL carrier frequency on which the measurement gaps are to be activated may be determined based on the combination of the network 20 configuration (e.g. explicit signalling 4) and the pre-defined rules of the communication terminal/UE 14. For example, any of the network configuration principles described above may be used to pre-configure the gaps. This means that the network may pre-configure the gaps on more than one DL carrier, e.g. F1 and F2. However, in addition to the pre-configuration, the UE may use any of the pre-determined rules described above to itself activate the gaps on the suitable downlink carrier, e.g. the UE may choose F2 to activate the gaps.

Furthermore, the UE 14 may explicitly signal 6 the information about the carrier on which it has activated 5 the gaps, e.g. the UE indicates to the RNC/Node B that it has activated the gaps (i.e. CM pattern #1) on F2. Alternatively, the network node 16 may itself, autonomously, detect the carrier over which the UE 14 has activated 5 the gaps by using similar principles as described above.

A network node 16, e.g. a network node which has determined 3 the carrier frequency for configuring the gap pattern, may inform another network node 16 about which carrier frequency has been determined 3. Additionally, or alternatively, a network node 16 which has been informed 6 by the communication terminal 14 about on which carrier frequency the communication terminal has configured the gap pattern may inform another network node 16 about on which carrier frequency the gap pattern has been/will be configured 5. The communication between two network nodes 16 may be over the X2 radio interface. The network node 16 (e.g. RNC/Node B or eNode B or relay etc) may signal the information related to the DL carrier(s)/frequency band on which the measurement gaps are activated/configured 5 to other network nodes 16 (e.g. RNC/Node B, eNB, positioning node, core network node such as MME in LTE, relay node etc). The network node may be the one which configures the gaps or it can be any node 16 which contains the information about the DL carrier/band on which gaps are configured for performing the inter-frequency/Inter-RAT measurements.

For example, in LTE, the eNode B may signal this information to an other eNode B over the X2 interface. Similarly the eNode B may signal this information to a positioning node e.g. E-SMLC in LTE over the LPPa protocol. The positioning node may configure the UE to perform the positioning measurements e.g. RSTD measurements in LTE. These measurements may also be performed in the gaps on inter-frequency or on inter-RAT carriers. Another example is that of the relay node signalling this information to another relay node (e.g. in multi-hop relay system, but this also applies to single hop relay systems) or to the donor BS e.g. LTE relay node signalling this information to its donor eNode B.

Furthermore the UE 14 may signal 6 the information to certain related network nodes 16. The said information may comprise the DL carrier/band on which the gaps are configured/activated for measuring on inter-frequency/Inter-RAT carrier(s). Examples of the network nodes 16 to which the UE 14 may signal this information are: positioning node such as E-SMLC in LTE over the LPP protocol.

Some advantages associated with embodiments of the present invention are:

The network 20 may have the flexibility to specify 3 the DL carrier frequency over which the UE 14 shall configure the measurement gaps for performing the gap-assisted/gaps based measurements like inter-frequency/inter-RAT measurements.

The invention may prevent the situation where all or several gap patterns are configured on the same DL carrier. This may reduce the deterioration of the throughput and especially the peak data rate.

The invention may enable the possibility of completely avoiding configuring the measurement gaps/CM patterns on certain DL carriers. This in turn may ensure that on these DL carriers, which may also carry more important/time critical data, there is no throughput degradation due to the gaps.

It will be noted that modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for allowing a communication terminal to configure a measurement gap pattern on a downlink carrier frequency for measurement on a target carrier frequency by the communication terminal, the communication terminal being capable of performing measurements on at least two downlink carrier frequencies without a measurement gap, the method comprising:

obtaining an indication that there is a need for the measurement gap pattern for performing the measurement on the target carrier frequency;

retrieving information about how to configure the measurement gap pattern; and determining, based on the retrieved information, which of the at least two downlink carrier frequencies the measurement gap pattern is to be configured on, wherein the measurement gap pattern could be configured on any of the at least two downlink carrier frequencies to perform the measurement on the target carrier frequency;

wherein the retrieved information includes an indication of a specific downlink carrier frequency the measurement gap pattern is to be configured on, or includes at least one criterion to use for determining which of the at least two downlink carrier frequencies the measurement gap pattern is to be configured on.

2. The method of claim 1 wherein the communication terminal is a multi-carrier communication terminal.

3. The method of claim 1 wherein the downlink carrier frequency is a serving downlink carrier frequency.

4. The method of claim 1 wherein the method is performed in a network node of a network with which the communication terminal is associated, the method further comprising:

signalling to the communication terminal the determined downlink carrier frequency on which the measurement gap pattern is to be configured.

5. The method of claim 4 wherein the network node is one of a Radio Network Controller (RNC), a Node B, an eNode B, a base station, a relay node, and a donor node.

6. The method of claim 4 further comprising:

the network node informing a second network node of the network of the determined downlink carrier frequency on which the measurement gap pattern is to be configured.

7. The method of claim 6 wherein the second network node is one of a Radio Network Controller (RNC), a Node B, an eNode B, a positioning node, a base station, a core network node, a relay node, and a donor node.

8. The method of claim 1 wherein the method is performed in the communication terminal, the method further comprising:

configuring the measurement gap pattern on the determined downlink carrier frequency.

9. The method of claim 8 further comprising:

sending a signal to a network node of a network with which the communication terminal is associated, the signal including an indication of the determined downlink carrier frequency on which the measurement gap pattern is to be configured.

10. The method of claim 8 wherein the retrieving of information comprises:

receiving a signal from a network node of a network with which the communication terminal is associated, the received signal including at least a part of the retrieved information.

11. The method of claim 1 wherein the target carrier frequency is an inter-Radio Access Technology (RAT) carrier frequency or an inter-frequency carrier frequency in relation to the downlink carrier frequency.

12. The method of claim 1, wherein the at least one criterion includes at least one of:

a preference for a downlink carrier frequency which is adjacent to the least number of other downlink carrier frequencies of the communication terminal;

a preference for a downlink carrier frequency which shares a frequency band with the least number of other downlink carrier frequencies of the communication terminal;
a preference for a downlink carrier frequency where the amount of data interrupted, lost or both, due to the gap pattern is assumed to be the least;
a preference for a downlink carrier frequency over which data is the least time critical;
a preference for a downlink carrier where there is no other gap pattern already configured;
a preference for a downlink carrier based on whether a gap density of the gap pattern is above or below a pre-defined threshold;
a preference for a primary downlink carrier; and
a preference for a secondary downlink carrier.

13. The method of claim 1 wherein the communication terminal is configured for operation in an associated Wideband Code Division Multiple Access (W-CDMA) wireless communication network in which the measurement gap pattern is a Compressed Mode (CM) gap pattern.

14. The method of claim 13 wherein the W-CDMA network with which the communication terminal is associated has activated a CM which allows the determining of the downlink carrier frequency in response to receiving an Information Element from the communication terminal indicating to the network that the communication terminal supports the determining.

15. The method of claim 1 further comprising:
the communication terminal signalling information to a network with which the communication terminal is associated indicating the downlink carrier frequency on which it has configured the gap pattern.

16. A gap pattern module for a communication system, the communication system comprising a communication terminal and a network within which the communication terminal is operative to communicate, the communication terminal being capable of performing measurements on at least two downlink carrier frequencies without a measurement gap, the gap pattern module comprising:
a first circuit for obtaining an indication that there is a need for a measurement gap pattern configured by the communication terminal on a downlink carrier frequency for measurement on a target carrier frequency by the communication terminal;
a second circuit for retrieving information about how to configure the measurement gap pattern; and
one or more processing circuits configured to determine, based on the retrieved information, which of the at least two downlink carrier frequencies the measurement gap pattern is to be configured on, wherein the measurement gap pattern could be configured on any of the at least two downlink carrier frequencies to perform the measurement on the target carrier frequency;
wherein the retrieved information includes an indication of a specific downlink carrier frequency the measurement gap pattern is to be configured on, or includes at least one criterion to use for determining which of the at least two downlink carrier frequencies the measurement gap pattern is to be configured on.

17. A communication terminal capable of performing measurements on at least two downlink carrier frequencies without a measurement gap, the communications terminal comprising:
a gap pattern module comprising:
a first circuit for obtaining an indication that there is a need for a measurement gap pattern configured by the communication terminal on a downlink carrier frequency for measurement on a target carrier frequency by the communication terminal;
a second circuit for retrieving information about how to configure the measurement gap pattern; and
one or more processing circuits configured to determine, based on the retrieved information, which of the at least two downlink carrier frequencies the measurement gap pattern is to be configured on, wherein the measurement gap pattern could be configured on any of the at least two downlink carrier frequencies to perform the measurement on the target carrier frequency;
wherein the retrieved information includes an indication of a specific downlink carrier frequency the measurement gap pattern is to be configured on, or includes at least one criterion to use for determining which of the at least two downlink carrier frequencies the measurement gap pattern is to be configured on; and
a third circuit for configuring the measurement gap pattern on the determined downlink carrier frequency.

18. The communication terminal of claim 17 further comprising:
a transmitter configured to send a signal to a network node of a network within which the communication terminal is operative to communicate, the signal including an indication of the determined downlink carrier frequency.

19. A network node comprising:
a gap pattern module for a communication system, the communication system comprising a communication terminal and a network within which the communication terminal is operative to communicate, the communication terminal being capable of performing measurements on at least two downlink carrier frequencies without a measurement gap, the gap pattern module comprising:
a first circuit for obtaining an indication that there is a need for a measurement gap pattern configured by the communication terminal on a downlink carrier frequency for measurement on a target carrier frequency by the communication terminal;
a second circuit for retrieving information about how to configure the measurement gap pattern; and
one or more processing circuits configured to determine, based on the retrieved information, which of the at least two downlink carrier frequencies the measurement gap pattern is to be configured on, wherein the measurement gap pattern could be configured on any of the at least two downlink carrier frequencies to perform the measurement on the target carrier frequency;
wherein the retrieved information includes an indication of a specific downlink carrier frequency the measurement gap pattern is to be configured on, or includes at least one criterion to use for determining which of the at least two downlink carrier frequencies the measurement gap pattern is to be configured on; and
a transmitter configured for signalling to the communication terminal an indication of which downlink carrier frequency has been determined.

20. A communication system comprising:
a network;
a communication terminal operative to communicate within the network, and being capable of performing measurements on at least two downlink carrier frequencies without a measurement gap;

a gap pattern module comprising:
- a first circuit for obtaining an indication that there is a need for a measurement gap pattern configured by the communication terminal on a downlink carrier frequency for measurement on a target carrier frequency by the communication terminal;
- a second circuit for retrieving information about how to configure the measurement gap pattern; and
- one or more processing circuits configured to determine, based on the retrieved information, which of the at least two downlink carrier frequencies the measurement gap pattern is to be configured on, wherein the measurement gap pattern could be configured on any of the at least two downlink carrier frequencies to perform the measurement on the target carrier frequency;
- wherein the retrieved information includes an indication of a specific downlink carrier frequency the measurement gap pattern is to be configured on, or includes at least one criterion to use for determining which of the at least two downlink carrier frequencies the measurement gap pattern is to be configured on.

21. A gap pattern module for a communication system, the communication system comprising a communication terminal and a network within which the communication terminal is operative to communicate, the communication terminal being capable of performing measurements on at least two downlink carrier frequencies without a measurement gap, the gap pattern module comprising one or more circuits configured to:
- obtain an indication that there is a need for a measurement gap pattern configured by the communication terminal on a downlink carrier frequency for measurement on a target carrier frequency by the communication terminal;
- retrieve information about how to configure the measurement gap pattern; and
- determine, based on the retrieved information, which of the at least two downlink carrier frequencies the measurement gap pattern is to be configured on, wherein the measurement gap pattern could be configured on any of the at least two downlink carrier frequencies to perform the measurement on the target carrier frequency;
- wherein the retrieved information includes an indication of a specific downlink carrier frequency the measurement gap pattern is to be configured on, or includes at least one criterion to use for determining which of the at least two downlink carrier frequencies the measurement gap pattern is to be configured on.

22. A computer program product stored in a non-transitory computer-readable medium, the computer program product comprising program instructions for configuring a measurement gap pattern on a downlink carrier frequency for measurement on a target carrier frequency by a communication terminal that is capable of performing measurements on at least two downlink carrier frequencies without a measurement gap, the computer program product comprising computer program code which, when run on a processor of the mobile terminal, configures the mobile terminal to:
- obtain an indication that there is a need for the measurement gap pattern for performing the measurement on the target carrier frequency;
- retrieve information about how to configure the measurement gap pattern; and
- determine, based on the retrieved information, which of the at least two downlink carrier frequencies the measurement gap pattern is to be configured on, wherein the measurement gap pattern could be configured on any of the at least two downlink carrier frequencies to perform the measurement on the target carrier frequency;
- wherein the retrieved information includes an indication of a specific downlink carrier frequency the measurement gap pattern is to be configured on, or includes at least one criterion to use for determining which of the at least two downlink carrier frequencies the measurement gap pattern is to be configured on.

\* \* \* \* \*

UNITED STATES PATENT AND TRADEMARK OFFICE
CERTIFICATE OF CORRECTION

| | | |
|---|---|---|
| PATENT NO. | : 8,842,564 B2 | Page 1 of 1 |
| APPLICATION NO. | : 13/375512 | |
| DATED | : September 23, 2014 | |
| INVENTOR(S) | : Kazmi et al. | |

It is certified that error appears in the above-identified patent and that said Letters Patent is hereby corrected as shown below:

In the Specification

In Column 7, Line 41, delete "downlink carreier" and insert -- downlink carrier --, therefor.

Signed and Sealed this
Twenty-first Day of April, 2015

Michelle K. Lee
*Director of the United States Patent and Trademark Office*